US012650995B2

(12) United States Patent
Shin

(10) Patent No.: US 12,650,995 B2
(45) Date of Patent: Jun. 9, 2026

(54) UTILIZING PREVIOUS INTERMEDIATE MODEL OUTPUT FOR GENERATING RESPONSES

(71) Applicant: GOOGLE LLC, Mountain View, CA (US)

(72) Inventor: Dongeek Shin, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/774,883

(22) Filed: Jul. 16, 2024

(65) Prior Publication Data

US 2026/0023747 A1 Jan. 22, 2026

(51) Int. Cl.
*G06F 16/2457* (2019.01)
(52) U.S. Cl.
CPC .............................. *G06F 16/24578* (2019.01)
(58) Field of Classification Search
CPC ................................................ G06F 16/24578
See application file for complete search history.

(56) References Cited

U.S. PATENT DOCUMENTS

2022/0398433 A1* 12/2022 Andalman ....... G06Q 10/06375
2024/0311644 A1* 9/2024 Bertolli .................. G06N 3/096

* cited by examiner

*Primary Examiner* — Jay A Morrison
(74) *Attorney, Agent, or Firm* — Gray Ice Higdon

(57) ABSTRACT

Implementations relate to storing historical queries processed using a generative model in association with intermediate model outputs generated using the generative model for each of the historical queries. Implementations further relate to receiving a user query processable using the generative model. In response to receiving the user query, the user query can be compared to the historical queries to identify a particular historical query (e.g., having a similarity score satisfying a similarity threshold) that matches the user query. Particular intermediate model output associated with the particular historical query can be selected from all intermediate model outputs stored in association with the particular historical query, and a response to the user query can be generated based at least on the selected particular intermediate model output associated with the particular historical query.

18 Claims, 8 Drawing Sheets

Figure 1A:
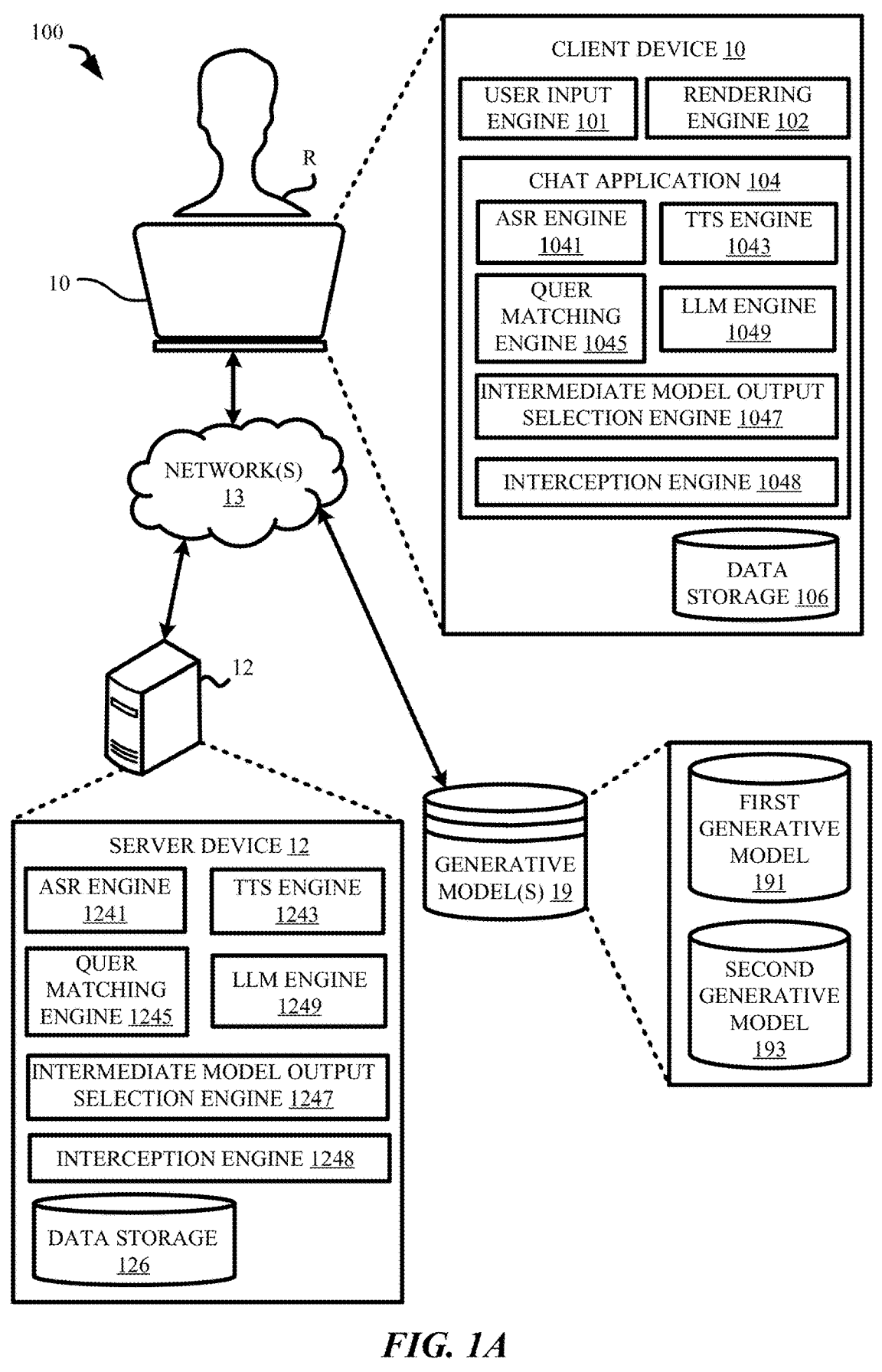

100

R

10

CLIENT DEVICE 10

USER INPUT ENGINE 101

RENDERING ENGINE 102

CHAT APPLICATION 104

ASR ENGINE 1041

TTS ENGINE 1043

QUER MATCHING ENGINE 1045

LLM ENGINE 1049

INTERMEDIATE MODEL OUTPUT SELECTION ENGINE 1047

INTERCEPTION ENGINE 1048

DATA STORAGE 106

NETWORK(S) 13

12

SERVER DEVICE 12

ASR ENGINE 1241

TTS ENGINE 1243

QUER MATCHING ENGINE 1245

LLM ENGINE 1249

INTERMEDIATE MODEL OUTPUT SELECTION ENGINE 1247

INTERCEPTION ENGINE 1248

DATA STORAGE 126

GENERATIVE MODEL(S) 19

FIRST GENERATIVE MODEL 191

SECOND GENERATIVE MODEL 193

| # | QUERY | ASSOCIATED INTERMEDIATE MODEL OUTPUT(S) | | | |
|---|---|---|---|---|---|
| 1 | $D_1\_Q_1$ | $D_1\_Q_1\_MO_{11}$ | $D_1\_Q_1\_MO_{12}$ | ... | $D_1\_Q_1\_MO_{1,N1}$ |
| 2 | $D_1\_Q_2$ | $D_1\_Q_2\_MO_{21}$ | $D_1\_Q_2\_MO_{22}$ | ... | $D_1\_Q_2\_MO_{2,N1}$ |
| ⋮ | ⋮ | ... | ... | ... | ... |
| P1 | $D_1\_Q_{P1}$ | $D_1\_Q_{P1}\_MO_{P1,1}$ | $D_1\_Q_{P1}\_MO_{P1,2}$ | ... | $D_1\_Q_{P1}\_MO_{P1,N1}$ |

(a)

$D_2$

| # | QUERY | ASSOCIATED INTERMEDIATE MODEL OUTPUT(S) | | | |
|---|---|---|---|---|---|
| 1 | $D_2\_Q_1$ | $D_2\_Q_1\_MO_{11}$ | $D_2\_Q_1\_MO_{12}$ | ... | $D_2\_Q_1\_MO_{1,N2}$ |
| 2 | $D_2\_Q_2$ | $D_2\_Q_2\_MO_{21}$ | $D_2\_Q_2\_MO_{22}$ | ... | $D_2\_Q_2\_MO_{2,N2}$ |
| ⋮ | ⋮ | ... | ... | ... | ... |
| P2 | $D_2\_Q_{P2}$ | $D_2\_Q_{P2}\_MO_{P2,1}$ | $D_2\_Q_{P2}\_MO_{P2,2}$ | ... | $D_2\_Q_{P2}\_MO_{P2,N2}$ |

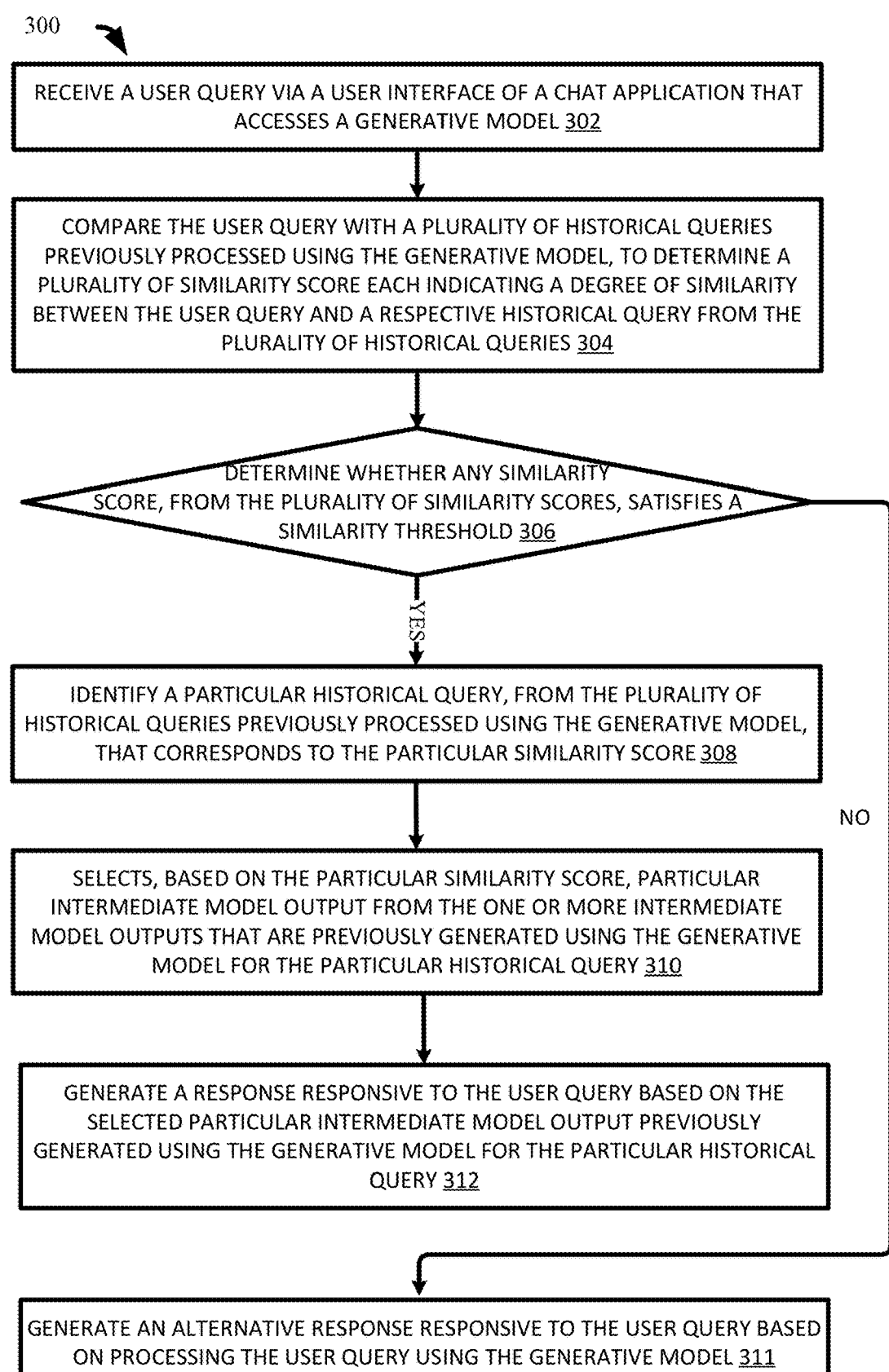

RECEIVE A USER QUERY VIA A USER INTERFACE OF A CHAT APPLICATION THAT ACCESSES A GENERATIVE MODEL 302

COMPARE THE USER QUERY WITH A PLURALITY OF HISTORICAL QUERIES PREVIOUSLY PROCESSED USING THE GENERATIVE MODEL, TO DETERMINE A PLURALITY OF SIMILARITY SCORE EACH INDICATING A DEGREE OF SIMILARITY BETWEEN THE USER QUERY AND A RESPECTIVE HISTORICAL QUERY FROM THE PLURALITY OF HISTORICAL QUERIES 304

DETERMINE WHETHER ANY SIMILARITY SCORE, FROM THE PLURALITY OF SIMILARITY SCORES, SATISFIES A SIMILARITY THRESHOLD 306

YES

NO

IDENTIFY A PARTICULAR HISTORICAL QUERY, FROM THE PLURALITY OF HISTORICAL QUERIES PREVIOUSLY PROCESSED USING THE GENERATIVE MODEL, THAT CORRESPONDS TO THE PARTICULAR SIMILARITY SCORE 308

SELECTS, BASED ON THE PARTICULAR SIMILARITY SCORE, PARTICULAR INTERMEDIATE MODEL OUTPUT FROM THE ONE OR MORE INTERMEDIATE MODEL OUTPUTS THAT ARE PREVIOUSLY GENERATED USING THE GENERATIVE MODEL FOR THE PARTICULAR HISTORICAL QUERY 310

GENERATE A RESPONSE RESPONSIVE TO THE USER QUERY BASED ON THE SELECTED PARTICULAR INTERMEDIATE MODEL OUTPUT PREVIOUSLY GENERATED USING THE GENERATIVE MODEL FOR THE PARTICULAR HISTORICAL QUERY 312

GENERATE AN ALTERNATIVE RESPONSE RESPONSIVE TO THE USER QUERY BASED ON PROCESSING THE USER QUERY USING THE GENERATIVE MODEL 311

*FIG. 3*

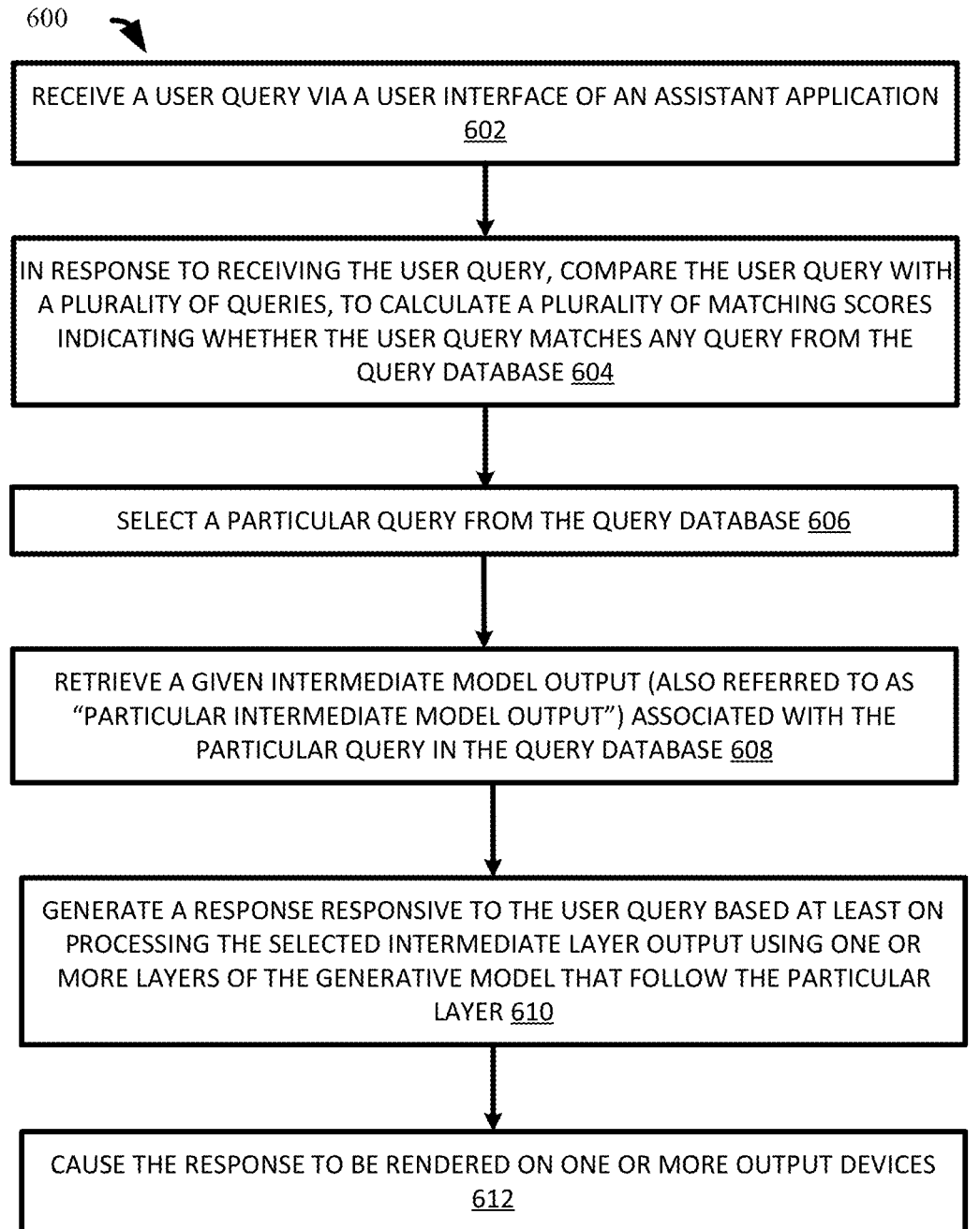

600

RECEIVE A USER QUERY VIA A USER INTERFACE OF AN ASSISTANT APPLICATION
602

IN RESPONSE TO RECEIVING THE USER QUERY, COMPARE THE USER QUERY WITH A PLURALITY OF QUERIES, TO CALCULATE A PLURALITY OF MATCHING SCORES INDICATING WHETHER THE USER QUERY MATCHES ANY QUERY FROM THE QUERY DATABASE 604

SELECT A PARTICULAR QUERY FROM THE QUERY DATABASE 606

RETRIEVE A GIVEN INTERMEDIATE MODEL OUTPUT (ALSO REFERRED TO AS "PARTICULAR INTERMEDIATE MODEL OUTPUT") ASSOCIATED WITH THE PARTICULAR QUERY IN THE QUERY DATABASE 608

GENERATE A RESPONSE RESPONSIVE TO THE USER QUERY BASED AT LEAST ON PROCESSING THE SELECTED INTERMEDIATE LAYER OUTPUT USING ONE OR MORE LAYERS OF THE GENERATIVE MODEL THAT FOLLOW THE PARTICULAR LAYER 610

CAUSE THE RESPONSE TO BE RENDERED ON ONE OR MORE OUTPUT DEVICES
612

*FIG. 6*

UTILIZING PREVIOUS INTERMEDIATE MODEL OUTPUT FOR GENERATING RESPONSES

BACKGROUND

Generative models (e.g., large language models, "LLMs") find increasing applications in user interactive systems (e.g., a chat application, an automated assistant application, etc.) for computer-to-human interactions. LLM(s) have been developed that can be used to process NL content and/or other input(s), to generate LLM output that reflects generative NL content and/or other generative content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

For example, a generative model can have multiple computing layers (e.g., neural network layers, may simply be referred to as "layers") such as one or more embedding layers, one or more attention layers, one or more feed-forward layers, and/or a softmax layer, etc. The multiple computing layers can each have corresponding parameters. For example, an embedding layer can have embedding parameters, an attention layer can have attention parameters, and a feed-forward layer can have feed-forward parameters. The multiple computing layers of the generative model can have other parameters such as positional encoding parameters, normalization parameters, etc.

As a result, many generative models can be of a very large size, often including billions of parameters (e.g., over 100 billion parameters, over 250 billion parameters, or over 500 billion parameters). Due to the large size of the generative models, significant memory, processor, power, and/or other computational resource(s) can be required to process an input, using the generative model, to generate a corresponding generative output. This resource utilization can be significant on a per input basis, and very significant when hundreds or thousands of inputs are being processed per minute, per second, or other interval. Also, due to the large size of the generative models, there can be significant latency in generating a corresponding generative output and, as a result, in rendering corresponding generative content. Such latency can lead to prolonging of a user-to-computer interaction. Further, due to the large size of the generative models, many or all client devices may be unable to utilize such a generative model on-device. For example, memory constraints of a client device can prevent such a generative model from being loaded into memory.

SUMMARY

Techniques described herein are directed to selecting and utilizing precomputed intermediate model output to reduce a latency in using a generative model to generate a response responsive to a user query. In various implementations, a system (e.g., a chat application or an automated assistant application utilizing the generative model) can collect a plurality of queries (may be referred to as "historical queries") previously processed using the generative model. The plurality of queries can be collected, e.g., from multiple users and/or from multiple devices. The system can further collect one or more intermediate model outputs for each of the plurality of queries processed using the generative model. The plurality of queries and their associated intermediate model outputs can be stored in a query database (or more than one database) for subsequent use, e.g., to help reduce latency in generating responses to user queries.

As a working example, the generative model can include (e.g., sometimes only include) a transformer decoder having multiple computing layers. For instance, the generative model can include a total of N computing layers, including but are not limited to, one or more attention layers, one or more feed-forward layers, etc., Given a plurality of queries (e.g., a first query, a second query, . . . , a $P^{th}$ query), each query (from the plurality of queries) can be processed using the generative model, and during processing, a first model output, a second model output, . . . , and an $N^{th}$ model output can be acquired/precomputed for a respective query. The first, second, . . . , and $N^{th}$ model outputs associated with the respective query (from the plurality of queries) can be stored in the query database in association with the respective query. It is noted that, P and N can be positive integers greater than or equal to "1", where "P" can be the same as (or different from) "N".

The query database can be associated with (e.g., be specific to) the generative model and can include, for instance, a total number of "P" entries, such as a first entry for the first query, a second entry for the second query, . . . , and a $P^{th}$ entry for the $P^{th}$ query. The first entry for the first query can include the first model output (e.g., "$MO_{11}$") generated/precomputed during processing of the first query (i.e., using the generative model), the second model output (e.g., "$MO_{12}$") generated/precomputed during processing of the first query (i.e., using the generative model), . . . , and the $N^{th}$ model output (e.g., "$MO_{1N}$") generated/precomputed during processing of the first query (i.e., using the generative model). The second entry for the second query can include the first model output (e.g., "$MO_{21}$") generated during processing of the second query (i.e., using the generative model), the second model output (e.g., "$MO_{22}$") generated during processing of the second query (i.e., using the generative model), . . . , and the $N^{th}$ model output (e.g., "$MO_{2N}$") generated during processing of the second query (i.e., using the generative model) . . . . The $P^{th}$ entry for the $P^{th}$ query can include the first model output (e.g., "$MO_{P1}$") generated during processing of the $P^{th}$ query (i.e., using the generative model), the second model output (e.g., "$MO_{P2}$") generated during processing of the $P^{th}$ query (i.e., using the generative model), . . . , and the $N^{th}$ model output (e.g., "$MO_{PN}$") generated during processing of the $P^{th}$ query (i.e., using the generative model).

Subsequently, when a new user query is received, the system can perform query matching to determine whether the new user query is associated with (e.g., similar to) any query stored in the query database. For example, the system can determine that the new user query is similar to a particular query (e.g., query M) in the query database based on a degree of similarity (shortly referred to as "similarity", or other types of matching score) between the new user query and the particular query M satisfying a first similarity threshold (e.g., 0.8). In some implementations, depending on the degree of similarity between the new user query and the particular query M, the system can select particular intermediate model output (e.g., "$MO_{Mi}$", where $1 \leq i \leq N$) from all intermediate model outputs that are stored in the $M^{th}$ entry of the query database that were previously generated (i.e., precomputed) for the query M using the generative model. The particular intermediate model output (e.g., "$MO_{Mi}$") can be previously generated from an $i^{th}$ layer of the generative model when processing the query M. It is noted that the higher the degree of similarity, the higher the value of "i", which means less layers of the generative model are utilized to process the particular intermediate model output (e.g., "$MO_{Mi}$") in order to generate the response for the new user query.

As a non-limiting example, the $i^{th}$ layer of the generative model, for instance, can correspond to a sub-network that includes a self-attention sub-layer, a connection layer, and/or a normalization layer connected sequentially (e.g., the connection layer can be connected to the self-attention sub-layer to receive output from the self-attention sub-layer, and the normalization layer can be connected to the connection layer to receive output from the connection layer). The selected intermediate model output (e.g., "$MO_{Mi}$") can be processed, using a portion of the generative model (e.g., the $(i+1)^{th}$ layer and any subsequent layers, if there are any), to generate the response for the new user query. By using a portion of the generative model (e.g., a few layers of neural networks) instead of all layers of the generative model in processing the selected intermediate model output (e.g., "$MO_{Mi}$"), latency in generating the response for the new user query can be largely reduced, and consumption of computational resources can be reduced.

Continuing with the non-limiting example above, the $(i+1)^{th}$ layer of the generative model can include an additional self-attention sub-layer, an additional connection layer, and/or an additional normalization layer connected sequentially, where the additional self-attention sub-layer in the $(i+1)^{th}$ layer is connected to the normalization layer in the $i^{th}$ layer. By providing the selected intermediate model output (e.g., "$MO_{Mi}$") to the $(i+1)^{th}$ layer of the generative model, processing of the selected intermediate model output (e.g., "$MO_{Mi}$") can be performed using a portion of the generative model (e.g., starting from the $(i+1)^{th}$ layer), in order to generate the response for the new user query.

In some implementations, in response to receiving the new user query, the new user query can be processed using the generative model while the new user query is being compared with all queries ("historical queries") from the query database that is associated with the generative model. Optionally, in some implementations, in response to the system selecting the intermediate model output ("$MO_{Mi}$") from all intermediate model outputs stored in association with the particular query M and in response to the system determining that the degree of similarity satisfies a second similarity threshold (e.g., 0.9 or 0.99, which is greater than the aforementioned first similarity threshold and which indicates a sufficient/high similarity or even an exact match), whether the new user query (e.g., currently being processed using the generative model) has been processed using the $i^{th}$ layer of the generative model can be determined. In response to determining that the new user query (currently being processed using the generative model) has not been processed using the $i^{th}$ layer of the generative model, processing of the new user query can be paused or terminated, and the selected intermediate model output ("$MO_{Mi}$") can be processed directly using the $(i+1)^{th}$ layer of the generative model, to compute the response for the new user query. It is noted that query matching (e.g., using text embeddings and/or image embeddings) is often a process requiring much less time than processing the new user query using the generative model. As a result, it can be rare to find that the new user query has been processed using the $i^{th}$ layer of the generative model when the intermediate model output ("$MO_{Mi}$") is selected from all intermediate model outputs stored in association with the particular query M. However, in rare cases where new user query has been processed using the $i^{th}$ layer of the generative model when the intermediate model output ("$MO_{Mi}$") is selected, the processing of the new user query (that is optionally initiated in response to receiving the new user query) can be continued, to eventually generate the response based on processing the new user query, without processing the selected intermediate model output ("$MO_{Mi}$").

In some implementations, in response to the system selecting the intermediate model output ("$MO_{Mi}$") from all intermediate model outputs stored in association with the particular query M and in response to the system determining that the degree of similarity satisfies the first similarity threshold (e.g., 0.8) but not satisfy the second similarity threshold (e.g., 0.9), a latest intermediate model output generated by the generative model for the new user query can be retrieved. The latest intermediate model output generated by the generative model for the new user query can be combined with the selected the intermediate model output ("$MO_{Mi}$") generated by the generative model for the particular query M (that is determined as matching, or similar to, the new user query), to generate a combined intermediate input. The combined intermediate input can be processed using a portion of the generative model (e.g., starting from the $(i+1)^{th}$ layer of the generative model), in order to formulate a response for the new user query.

Optionally, the new user query can be processed (e.g., using a text encoder, an image encoder, etc.) to generate a tokenized representation (e.g., a text embedding, an image embedding, etc.) of the new user query. For example, the new user query can include text from a typed user input or text recognized from audible input. In this example, a text embedding can be generated for the new user query using the text encoder. The text embedding can be in the format of a n-dimensional numerical vector, and the text encoder can be a convolutional neural network ("CNN") with an embedding head that converts/maps content features of the text (e.g., included in the typed user input or recognized from the audible input) to the text embedding in a latent space (e.g., n-dimensional space).

As another example, the new user query can include visual content from an image, a video, etc. In this example, an image embedding can be generated for the new user query using the image encoder. The image embedding can be in the format of a n-dimensional numerical vector, and the image encoder can be a convolutional neural network ("CNN") with an embedding head that converts/maps pixel values of the visual content (e.g., image, video, etc.) to the image embedding in a latent space (e.g., n-dimensional space). The text encoder or the image encoder can be, but does not necessarily need to be, part of the generative model. In some implementations, the new user query can be processed using an audio encoder. For instance, the new user query can include audible input capturing a speech. In this example, an audio embedding can be generated for the new user query using an audio encoder. The audio embedding can be in the format of an n-dimensional numerical vector and represents acoustic features associated with the speech. The present disclosure is, however, not limited thereto.

In some implementations, the system can combine the tokenized representation of the new user query and the selected intermediate model output ("$MO_{Mi}$"), to generate a combined tokenized representation. Optionally, the system can combine the tokenized representation of the new user query and the selected intermediate model output ("$MO_{Mi}$"), in response to the system selecting/identifying the intermediate model output ("MO$_{Mi}$") from all intermediate model outputs stored in association with the particular query M (and regardless of whether the degree of similarity satisfies the second similarity threshold, as long as the degree of similarity satisfies the first similarity threshold). The combined tokenized representation can be provided to the $(i+1)^{th}$ layer of the generative model for processing using a portion of the generative model, thereby resulting in a final model output from which the response for the new user query is derived. It is noted that implementations are not limited to descriptions herein, and more details will be provided later in this disclosure. For example, the techniques described herein may be limited to applications involving generative models, and may be applicable to other types of machine learning models.

By utilizing techniques described herein, such as identifying a historical query that is similar to a new user query and by selecting intermediate model output from one or more intermediate model output precomputed (e.g., using a generative model) for the historical query (identified as being is similar to the new user query), latency in generating a response for the new user query (e.g., using the generative model) can be reduced. Implementations described herein also save computational resources, and in some cases, enable a portion of the generative model (e.g., $(i+1)^{th}$ layer and any subsequent layer) to be deployed at a client device, which further reduces consumption of network resources and saves time associated with transmission of data (e.g., user query and associated metadata) from the client device to a server device and transmission of data (e.g., a response responsive to the user query) from the server device back to the client device in case the generative model is too large to be hosted at the client device.

In some implementations, the generative model can be, for instance, a large language model ("LLM") that the user interactive system includes (or otherwise accesses). In some implementations, the LLM can be transformer-based. In some implementations, the LLM can include a decoder portion (sometimes referred to as "LLM decoder", "transformer decoder", etc.) and/or an encoder portion (sometimes referred to as "LLM encoder", "transformer encoder", etc.). The encoder portion of the LLM can include one or more multi-head attention mechanisms (may be referred to shortly as "multi-head attention(s)" or "multi-head attention layer(s)"), where each multi-head attention mechanism can include multiple attention heads. Additionally, or alternatively, the decoder portion of the LLM can include one or more multi-head attention mechanisms, where each multi-head attention mechanism can include multiple attention heads.

In some implementations, each of the multiple attention heads in the multi-head attention mechanism of the encoder portion (or the decoder portion) can be, for instance, a single attention head including a query matrix, a key matrix, and a value matrix. In some implementations, each multi-head attention mechanism can be coupled to a connection layer and a normalization layer (collectively referred to as "add&norm layer"). The connection layer can combine the one or more self-attention sub-model outputs generated from multiple attention heads, to generate a combined self-attention sub-model output. The normalization layer can normalize the combined self-attention sub-model output, to generate an intermediate model output. Descriptions of the generative model, however, are not limited thereto.

In various implementations, a computer-implemented method ("a method") is provided and can be implemented using the aforementioned system (e.g., a user interactive system that enables human-to-computer interactions). The user interactive system can be, or can include, a chat application (or an assistant application, etc.) providing human-to-computer interactions. In various implementations, the method can include: receiving a user query via a user interface of a chat application, where the chat application accesses a generative model having a plurality of computing layers (e.g., a plurality of neural network layers connected to each other). The user query can be a typed user input, a spoken input, an image-based input, etc.

In some of the various implementations, the plurality of computing layers can include, for instance, one or more input layers, one or more attention layers, one or more feed-forward layers, one or more fully connected layers, one or more softmax layers, other types of computing layers, and/or any combination thereof. The present disclosure is not limited thereto. The one or more input layers can include, for instance, a text embedding layer that processes text input to generate a text embedding of the text input, an image embedding layer that processes pixels of graphical input (e.g., an image, or other image-based input) to generate an image embedding of the graphical image, and/or an audio embedding layer that processes audible features of an audio input to generate an audio embedding of the audio input, etc.

In various implementations, the method can further include, in response to receiving the user query, comparing the user query with a plurality of historical queries (e.g., stored in a query database) to determine (e.g., calculate) a plurality of similarity scores (e.g., "degrees of similarity"). The plurality of similarity scores can include, for instance, a first similarity score of approximately 0.54, a second similarity score of approximately 0.87, a third similarity score of approximately 0.21, etc. The plurality of similarity score can then be utilized to identify/determine whether the user query matches (or is similar to) any historical query from the query database. The query database can be associated with the generative model and further stores, for each of the plurality of historical queries, one or more intermediate model output that were previously output from one or more layers of the plurality of computing layers of the generative model based on prior processing of a respective historical query.

In various implementations, the method can further include, in response to a particular similarity score, from the plurality of similarity scores, indicating that the user query matches (or is similar to) a particular historical query from the query database, selecting intermediate model output, from one or more intermediate model outputs that were previously output by the generative model during processing of the particular historical query based on the particular similarity score. The selected intermediate model output can be precomputed using a particular layer of the generative model during the prior processing of the particular historical query.

In various implementations, the method can further include: generating a response responsive to the user query based at least on processing the selected intermediate model output using a portion of the generative model. The portion of the generative model can include one or more layers of the generative model that are subsequent to the aforementioned particular layer (e.g., starting from the $(i+1)^{th}$ layer). In some of the various implementations, the one or more layers of the generative model includes a final layer, to generate a final model output for the new user query. In some of the various implementations, the one or more layers of the generative model may include a subsequent layer that is immediately subsequent from the particular layer. In some of the various implementations, optionally, the one or more layers in the portion of the generative model may include one or more additional layers connected between the subsequent layer and the final layer. In some of the various implementations, optionally, the subsequent layer can be the final layer.

In various implementations, the method can further include: causing the response to be rendered in response to the user query. The response can be derived, for instance, from the aforementioned final model output. The response can be rendered, for instance, audibly and/or graphically. For example, the response can be rendered audibly via one or more speakers. Additionally, or alternatively, the response can be rendered graphically via a display.

In some of the various implementations, the method can further include: processing the user query to generate a tokenized representation of the user query. In some of the various implementations, processing the user query can be performed in response to receiving the user query. In some of the various implementations, generating the response responsive to the user query (based at least on processing the selected intermediate model output using the portion of the generative model) includes: combining the tokenized representation of the user query with the selected intermediate model output, to generate an intermediate input (also referred to as "combined tokenized representation", "combined intermediate input", etc.); processing the intermediate input, using the portion of the generative model, to generate a final model output; and generating the response responsive to the user query based on processing the final model output.

The preceding is presented as an overview of only some implementations disclosed herein. These and other implementations are disclosed in additional detail herein. For example, while various implementations above provide descriptions applicable to generative models, one or more of the various implementations may be applicable to other machine learning models. As another example, instead of the first similarity threshold (and/or the second similarity threshold), the system can have a total number of three different similarity threshold, four different similarity thresholds, etc., for the system to select the particular intermediate model output, from all intermediate model outputs that are stored in association with a historical query that is identified as being similar to (e.g., satisfying the first similarity threshold) the new user query.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 1A depicts a block diagram of an example environment that demonstrates various aspects of the present disclosure, and in which some implementations disclosed herein can be implemented.

FIG. 1B illustrates an example query database in accordance with various aspects of the present disclosure.

FIG. 3 depicts a flowchart illustrating an example method of generating a response, in accordance with various aspects of the present disclosure.

FIG. 6 depicts a flowchart illustrating an additional example method of generating a response, in accordance with various aspects of the present disclosure.

DETAILED DESCRIPTION

Figure 2A:
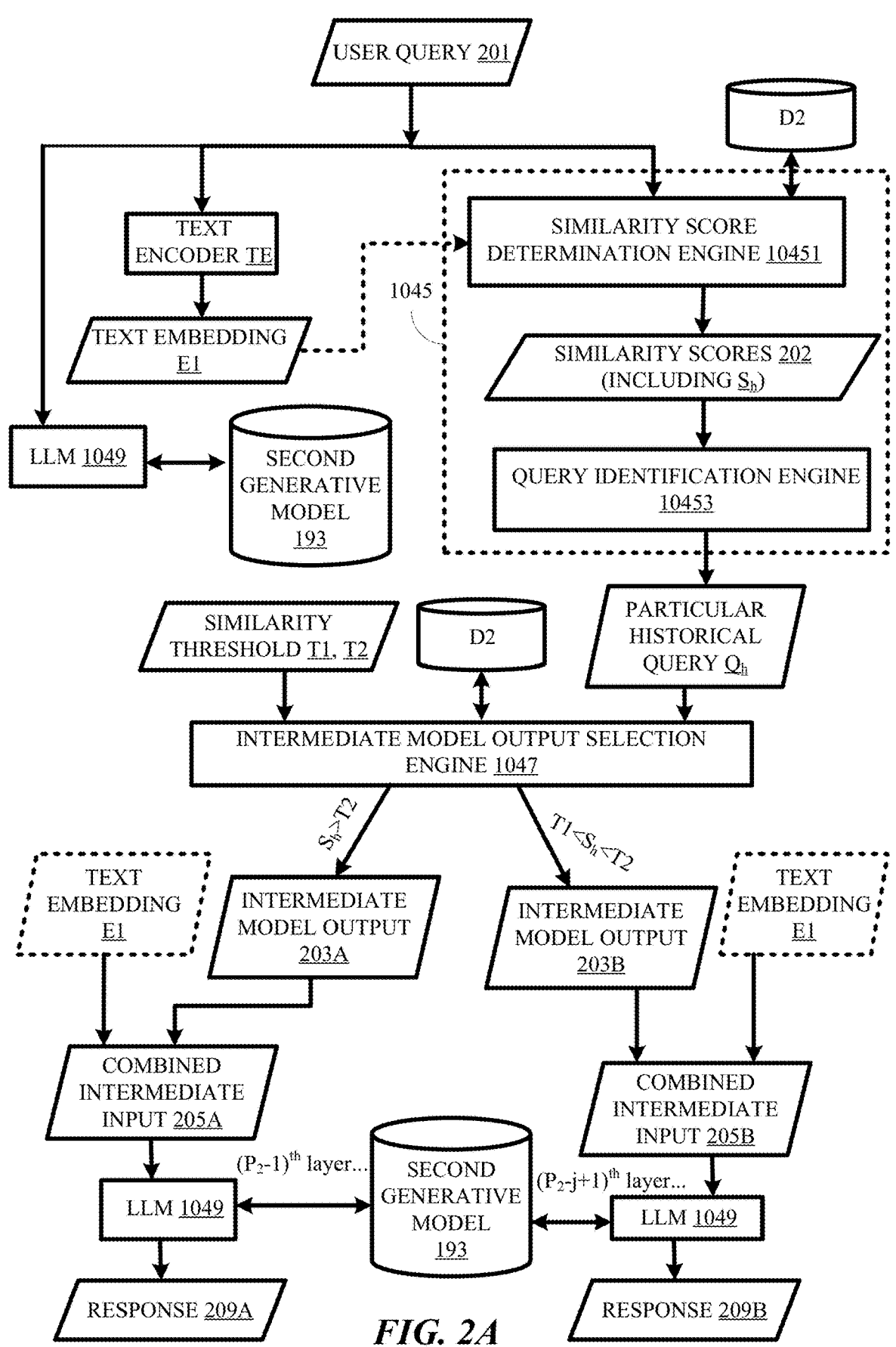
FIG. 2A illustrates an example process flow of generating a response in accordance with various aspects of the present disclosure.

One major issue of using generative models in generating responses for user queries is the relatively high end-to-end latency. For example, it may take several seconds to process a user input, using a generative model, in order to generate a response for the user input. The more layers (e.g., multi-head attention layers, feed-forward layers, etc.) the generative model includes, the higher the end-to-end latency can be. A generative model having a lot of layers and parameters is often hosted at a server device (instead of a client device) due to memory restraints at the client device. This requires transmission of the user input and associated metadata from the client device to the server device that hosts the generative model, for the response responsive to the user input to be generated. This further increases the latency. Therefore, given the increasing applications of generative models in human-to-computer interactions, there is a need in reducing the high end-to-end latency in generating responses using generative models.

To reduce the latency in generating responses using a given generative model that has N computing layers, the proposed techniques can create/generate a query database for the given generative model. The query database for the generative model is created to store: a plurality of queries (e.g., "historical queries") that have been processed using the given generative model. For each historical query in the query database, intermediate model output from one or more (e.g., each) of the N computing layers of the given generative model (when processing a corresponding historical query) can be collected. All available intermediate model outputs associated with the corresponding historical query can be stored in the query database for the corresponding historical query. The plurality of historical queries can be collected from a single user, or from various different users. The plurality of historical queries can be collected from a single device, or from various different devices.

For example, the query database for the given generative model can include an entry for a first historical query. The first historical query can be stored in the query database in association with intermediate model output from a first layer of the given generative model based on processing the first historical query, intermediate model output from a second layer of the given generative model based on processing the first historical query, . . . , and intermediate model output from the $N^{th}$ layer of the given generative model based on processing the first historical query. The first historical query can be from a first user. The query database for the given generative model can, additionally, or alternatively, include an entry for a second historical query. The second historical query can be stored in the query database in association with intermediate model output from a first layer of the given generative model based on processing the second historical query, intermediate model output from a second layer of the given generative model based on processing the second historical query, . . . , and intermediate model output from the $N^{th}$ layer of the given generative model based on processing the second historical query. The second historical query can be from a second user that is different from the first user. The query database for the given generative model can include additional entries for a third historical query, a fourth historical query, etc.

Subsequently, when a new user query is received for processing using the given generative model, the new user query can be compared with the plurality of historical queries in the query database to determine whether the new user query matches (or is similar to) any of the plurality of queries. In response to determining that the new user query matches (or is similar to) a particular query from the plurality of historical queries, one of the intermediate model outputs that are stored in association with the particular query can be selected based on a similarity score (e.g., a degree of similarity) between the new user query and the particular query. The selected intermediate model output associated with the particular query can be previously generated from an $i^{th}$ layer of the given generative model, and can be processed using $(i+1)^{th}$ layer of the given generative model, thereby skipping computations associated with the various other layers (e.g., 2nd, third, . . . , $i^{th}$ layer) of the given generative model. Optionally, an embedding can be generated for the new user query (e.g., using a first layer of the given generative model, which can be an input layer), and the embedding can be combined with the selected intermediate model output that is from the $i^{th}$ layer of the given generative model, to be processed using the $(i+1)^{th}$ layer, until a response is generated. Optionally, a latest intermediate model output for the new user query can be determined when the s, and the embedding can be combined with the selected intermediate model output, to be processed using the $(i+1)^{th}$ layer, until a response is generated.

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

FIG. 1A is a block diagram of an example environment 100 that demonstrates various aspects of the present disclosure, and in which implementations disclosed herein may be implemented. FIG. 1B illustrates an example query database in accordance with various aspects of the present disclosure.

As shown in FIG. 1A, the environment 100 can include a client computing device 10 ("client device") that is in communication with a server computing device 12 ("server device"). The client computing device 10 can be in communication with the server computing device 12, via one or more networks 13. The one or more networks 13 can include, for example, a local area network (LAN), a wide area network (WAN) such as the Internet, and/or any other appropriate network. In some implementations, the client computing device 10 and/or the server computing device 12 can access one or more machine learning (ML) models. The one or more ML models 19 can include, for instance, a first generative model 191, a second generative model 193, and/or other model(s). The first generative model 191 (or the second generative model 193) can include a plurality of layers such as an input layer, one or more attention layers (e.g., multi-head attention layer), one or more feed-forward layers, one or more fully connected layers, one or more softmax layers, etc.

In various implementations, the first generative model 191 (or the second generative model 193) can be a large language model ("LLM") having less than 100 billion parameters, more than 100 billion parameters, or over 200 billion parameters, etc. The greater the number of parameters of an LLM, the more complex (or sophisticated) a task (e.g., specified in a user query or request) the LLM can handle. The LLM may be stored at the client computing device 10, or at the server computing device 12. For instance, if memory of the client computing device 10 restricts the storing of the LLM at the client computing device 10 or if a token length of a user input (or prompt) to be processed using the LLM exceeds a predetermined token length, the LLM may be stored at the server computing device 12. For instance, if the memory of the client computing device 10 does not restrict the storing of the LLM at the client computing device 10, the LLM may be stored at the client computing device 10, to reduce a latency in completing a task (e.g., specified in the user query or request), for instance, by avoiding data communications via the one or more networks 13.

In some implementations, the LLM can be transformer-based and acquired based on fine-tuning a pre-trained LLM. One non-limiting example of the pre-trained LLM is GOOGLE'S Pathways Language Model (PaLM). Another non-limiting example of the pre-trained LLM is GOOGLE'S Language Model for Dialogue Applications (LaMDA).

In some implementations, the client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a smart watch, a virtual or augmented reality computing device), and the present disclosure is not limited thereto.

In some implementations, the client computing device 10 can include one or more applications installed locally at, or otherwise accessible via, the client computing device 10. The one or more applications of the client computing device 10 can include, for instance, a chat application 104 that includes, or otherwise accesses the first generative model 191 (or the second generative model 193) for performing human-to-user interactions (e.g., to carry out human-to-computer dialogs). In various implementations, the chat application 104 includes, or otherwise accesses, a user input engine 101 and/or a rendering engine 102. In some implementations, the client computing device 10 can include a data storage 106. The data storage 106 of the client computing device 10, for instance, can store metadata (e.g., a user profile of a user, etc.) associated with the one or more applications (e.g., 104) and/or associated with the client computing device 10.

The user input engine 101 can be configured to detect user input provided by a user of the client computing device 10. The user input can provide text content, visual content, audible content, and/or a combination thereof. The user input may be provided by the user using one or more user interface input devices, such as a keyboard, a touch screen, a microphone, etc. The user input can be typed input, touch input, audible input, or any other applicable type of input. For example, the client computing device 10 can be equipped with a keyboard to receive typed input, and/or a mouse (or one or more hardware buttons) to receive a user click that selects one or more graphical user interface (GUI) elements that is rendered visually at a user interface of the client computing device 10. Additionally, or alternatively, the client computing device 10 can be equipped with one or more microphones that capture audio data, such as audio data capturing spoken utterances of the user and/or other sounds in an environment of the client computing device 10. Additionally, or alternatively, the client computing device 10 can be equipped with one or more vision components that are configured to capture vision data corresponding to images and/or movements (e.g., gestures) detected within a field of view of one or more of the vision components. Additionally, or alternatively, the client computing device 10 can be equipped with one or more touch sensitive components (e.g., a stylus, a touch screen, a touch panel, etc.) that are configured to capture signal(s) corresponding to touch input that is directed to the client computing device 10.

In various implementations, the rendering engine 102 can be configured to provide content for audible and/or visual presentation to a user of the client computing device 10 using one or more user interface output devices (e.g., display, speaker, etc.). For example, the client computing device 10 can be equipped with one or more speakers that enable content (e.g., "Grapes, chocolate, onions, garlic can be food toxic to your dog") to be provided for audible presentation to a user of the client computing device 10. Additionally, or alternatively, the client computing device 10 can be equipped with a display or projector that enables content (e.g., "The nearest coffee shop is about 4 min away walking, would you like to check it in the map?") to be provided for visual presentation to the user via the client computing device 10.

In various implementations, the chat application 104 can include local components such as an automatic speech recognition (ASR) engine 1041 and/or a text-to-speech (TTS) engine 1043. Additionally or alternatively, the plurality of local components of the chat application 104 can include other component(s) such as a query matching engine 1045, an intermediate model output selection engine 1047, and/or an LLM engine 1049. It is noted that, in some implementations, the user input engine 101, the rendering engine 102, the ASR engine 1041, the TTS engine 1043, and/or some other engines (e.g., the LLM engine 1049) do not necessarily need to be all included in the chat application 104. For instance, the user input engine 101 and/or the rendering engine 102 can be included in the client computing device 10 and be shared across one or more of the applications that are installed at (or accessible via) the client computing device 10. As another example, the ASR engine 1041, the TTS engine 1043, the query matching engine 1045, the intermediate model output selection engine 1047, and/or the LLM engine 1049 can each additionally (or alternatively) have a corresponding cloud-based counterpart (e.g., 1241, 1243, 1245, 1247, 1249, etc.) that is located at, or accessible via, a server (e.g., the server computing device 12 or other server(s)). The cloud-based counterpart (e.g., 1247) can be configured to perform the same, or similar functions as its corresponding component (e.g., 1047) at the client computing device 10.

In some implementations, a user (e.g., user R) of the client computing device 10 may have a registered account associated with the chat application 104 and/or other application(s). The other applications can include, for example, a social media application, a video player, a note-taking application, a shopping application, a messaging application, and/or any other appropriate applications (or services), installed at, or accessible via, the client computing device 10.

In various implementations, the ASR engine 1041 can process, using one or more streaming ASR models (e.g., a recurrent neural network (RNN) model, a transformer model, and/or any other type of ML model capable of performing ASR), streams of audio data that capture spoken utterances (also referred to as "voice input", "user speech", etc.), to generate corresponding streams of ASR output. The ML model(s) can be on-device ML models that are stored locally at the client computing device 10, remote ML models that are executed remotely from the server computing device (e.g., at remote server device 12), or shared ML models that are accessible to the client computing device 10 and/or remote systems (e.g., the remote server computing device 12). The audio data can be acquired from audio recordings or can be generated by microphone(s) of the client computing device 10. Notably, the streaming ASR model can be utilized to generate the corresponding streams of ASR output as the streams of audio data are generated.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 1041 can select one or more of the ASR hypotheses as corresponding recognized text ("transcript", "transcription") that corresponds to the spoken utterance(s) (e.g., selected based on the corresponding predicted measures).

In various implementations, the TTS engine 1043 can process, using TTS model(s), corresponding streams of textual content (e.g., content generated based at least on processing the recognized text using the LLM, or a predetermined text, etc.), to generate synthesized speech audio data that includes computer-generated synthesized speech. The synthesized speech audio data can be rendered audibly via one or more user interface output devices, such as a speaker. In additional or alternative implementations, the synthesized speech audio data can be pre-cached in memory or in one or more databases accessible by the client computing device 10.

In various implementations, the LLM engine 1049 (or the cloud-based LLM engine 146) can access the first generative model 191 and/or the second generative model 193. In various implementations, the first generative model 191 (or the second generative model 193) can include a first layer (e.g., an input layer). The input layer, for instance, can include a text encoder that processes typed input (or text recognized from spoken input, or other types of user input), to generate a text representation (e.g., one or more text embeddings) that represents the typed input (or that represents the text recognized from the spoken input). In some implementations, the text embedding can be, for instance, in the form of an N-dimensional numerical vector (e.g., [0.0012567 . . . , −0.2368598.]) storing a total number of N floating point numbers, where N is a positive integer and can be in the order of hundreds, thousands, etc. The N-dimensional numerical vector can be a tokenized representation of one or more tokens, in a latent space, that belongs to the typed input (or the recognized text). A "token" refers to a unit of text data for processing using the first (or second) generative model 191, and can correspond to a word, one or more characters of a word, etc. In some implementations, a token can include not only character(s) but also punctuation(s), space(s), and/or emojis.

The input layer can additionally, or alternatively, include an image encoder that processes visual input (e.g., image, video, etc.), to generate an image representation (e.g., one or more image embeddings) that represents the visual input. In some implementations, the image embedding can be, for instance, in the form of a Q-dimensional numerical vector (e.g., [0.0028567 . . . , 0.2367798 . . . , . . . , . . . ]) storing a total number of Q floating point numbers. Q is a positive integer and can be in the order of hundreds, thousands, etc. In some implementations, the generative model can be a multi-modal generative model including both the image encoder and the text encoder. In this case, the value of "Q" can be the same as the value of "N". In some other implementations, the value of "Q" can be different from the value of "N".

Descriptions of the input layer (if any) of the first or second generative model, however, are not limited herein. For instance, the input layer of the first (or second) generative model 191 can include an audio encoder that processes acoustic features extracted from audio data that captures a spoken utterance, to generate an audio representation (e.g., one or more audio embeddings) that encodes the acoustic features of the audio data which captures the spoken utterance. For instance, the input layer of the first (or second) generative model 191 can include an image encoder that processes visual features extracted from pixels of visual content (e.g., image, video), to generate a visual representation (e.g., one or more image embeddings) that encodes the visual features of the visual content.

In various implementations, the first generative model 191 (or the second generative model 193) can include other layers (e.g., one or more encoder sub-networks each including an encoder self-attention sub-layer, one or more decoder sub-networks each including a decoder self-attention sub-layer, etc.). The encoder self-attention sub-layer (or the decoder self-attention sub-layer) can include, for instance, a multi-head attention mechanism (may be referred to shortly as "multi-head attention") having multiple attention heads. Each of the multiple attention heads in the multi-head attention mechanism can be, for instance, a single attention head including a query matrix, a key matrix, and a value matrix.

As a non-limiting example, the first generative model 191 (or the second generative model 193) can include a first decoder sub-network having a first decoder self-attention sub-layer that applies the multi-head attention mechanism to the text embedding (or the image embedding, or a combination thereof) output by the input layer, to generate one or more decoder self-attention sub-model outputs. The multi-head attention mechanism can be implemented, for instance, via one or more matrix multiplications (e.g., using a query matrix, a value matrix, and a key matrix). In some implementations, the first decoder sub-network can further include a connection layer and a normalization layer (collectively referred to as "add&norm layer"). The connection layer can combine the one or more decoder self-attention sub-model outputs, to generate a combined decoder self-attention sub-model output. The normalization layer can normalize the combined decoder self-attention sub-model output, to generate a first decoder output. The first generative model 191 (or the second generative model 193) can include a second decoder sub-network having a second decoder self-attention sub-layer that applies the multi-head attention mechanism to the first decoder output. This can be repeated (if there are more decoder sub-networks) until a final model output is determined, where the final model output can be processed to generate a response responsive to the typed input (or spoken input, or other types of user input).

It is noted that, the first generative model 191 (or the second generative model 193) can alternatively, or additionally, include a first encoder sub-network having a first encoder self-attention sub-layer that applies the multi-head attention mechanism to the text embedding (or the image embedding, or a combination thereof) output by the input layer, to generate one or more encoder self-attention sub-model outputs. The one or more encoder self-attention sub-model outputs can be processed, e.g., using the "add&norm layer", to generate a first encoder output. The first encoder output can be processed by a second encoder sub-network (if any), or the first decoder sub-network.

In some implementations, the final decoder output can be processed using a feed-forward layer and/or an add&norm layers. The feed-forward layer can be configured to operate on each position of a user input in a sequence of user inputs (e.g., by applying a sequence of transformations), to generate an output for the position. The linear layer can be configured to apply a learned linear transformation to an output from the last decoder sub-network of the first generative model 191 (or the second generative model 193), to project such output into an appropriate space for processing by the softmax layer. The softmax layer can be configured to generate a probability distribution ("model output") over a plurality of possible outputs at each time step. Based on the probability distribution, a possible output having a highest probability can be selected from the plurality of possible outputs, to generate a portion of a response for the spoken utterance(s). It is noted that components/layers of the first generative model 191 (or the second generative model 193) are not limited to descriptions herein.

In various implementations, the server computing device 12 can be, for example, a web server, one or more blade servers acting together to provide "cloud" infrastructure, or any other type of server as needed. In various implementations, optionally, the server computing device 12 can include a data storage 126 storing one or more query databases. In some implementations, the one or more query databases can also be stored at the client computing device 10 (or at the server device 12). The one or more query databases can include, for instance, a first query database D1 (see, e.g., (a) in FIG. 1B) associated with the first generative model 191, and/or a second query database D2 (see, e.g., (b) in FIG. 1B) associated with the second generative model 193.

The first query database D1 associated with the first generative model 191 can include a first set of entries storing a first set of historical queries and corresponding intermediate model outputs collected from the first generative model 191. For example, referring to FIG. 1B, the first query database D1 can include a total number of P1 entries each storing a respective historical query processed previously using the first generative model 191. Assuming the first generative model 191 includes a total number of N1 layers, the first query database D1 can include a first entry storing a first historical query $(D1\_Q_1)$ in association with a total number of N1 intermediate model outputs ("$D1\_Q1\_MO_{11}$", "$D1\_Q1\_MO_{12}$", . . . , "$D1\_Q1\_MO_{1,N1}$", or a portion thereof). The first query database D1 can further include a second entry storing a second historical query $(D1\_Q_2)$ in association with a total number of N1 intermediate model outputs ("$D1\_Q_2\_MO_{21}$", "$D1\_Q_2\_MO_{22}$", . . . , "$D1\_Q_2\_MO_{2,N1}$", or a portion thereof) . . . . The first query database D1 can further include a $(P1)^{th}$ entry storing a $(P1)^{th}$ historical query $(D1\_Q_{P1})$ in association with a total number of N1 intermediate model outputs ("$D1\_Q_{P1}\_MO_{P1,1}$", "$D1\_Q_{P1}\_MO_{P1,2}$", . . . , "$D1\_Q_{P1}\_MO_{P1,N1}$", or a portion thereof). In some implementations, the first query database D1 can be updated to include one or more additional entries storing additional queries that are processed using the first generative model 191, where the one or more additional entries can store the additional queries in association with corresponding intermediate model output generated by the first generative model 191 while processing the corresponding additional queries.

The second query database D2 associated with the second generative model 193 can include a second set of entries storing a second set of historical queries and corresponding intermediate model outputs collected from the second generative model 193. For example, referring to FIG. 1B, the second query database D2 can include a total number of P2 entries each storing a respective historical query processed previously using the second generative model 193. Assuming the second generative model 193 includes a total number of N2 layers, the second query database D2 can include a first entry storing a first historical query $(D2\_Q_1)$ in association with a total number of N2 intermediate model outputs ("$D2\_Q_1\_MO_{11}$", "$D2\_Q_1\_MO_{12}$", . . . , "$D2\_Q_1\_MO_{1N2}$", or a portion thereof). The second query database D2 can further include a second entry storing a second historical query $(D2\_Q_2)$ in association with a total number of N2 intermediate model outputs ("$D2\_Q_2\_MO_{21}$", "$D2\_Q_2\_MO_{22}$", . . . , "$D2\_Q_2\_MO_{2N2}$", or a portion thereof) . . . . The second query database D2 can further include a $(P2)^{th}$ entry storing a $(P2)^{th}$ historical query $(D2\_Q_{12})$ in association with a total number of N2 intermediate model outputs ("$D2\_Q_{P2}\_MO_{P2,1}$", "$D2\_Q_{P2}\_MO_{P2,2}$", . . . , "$D2\_Q_{P2}\_MO_{P2,N2}$", or a portion thereof). In some implementations, the second query database D2 can be updated to include one or more additional entries storing subsequent queries that are processed using the second generative model 193, where the one or more additional entries can store the subsequent queries in association with corresponding intermediate model output generated by the second generative model 193 while processing the corresponding subsequent queries.

The total number (e.g., P1) of entries or queries in the first query database D1 can be the same as or different from the total number (e.g., P2) of entries or queries in the second query database D2. The total number of layers (N1) in the first generative model 191 can be the same as or different from the total number of layers (N2) in the second generative model 193.

In some implementations, the chat application 104 can access the first generative model 191 (and/or the second generative model 193). In some implementations, a user query can be received via the chat application 104 during a human-to-computer dialog session. In this case, if the chat application 104 accesses the first generative model 191 for processing of the user query, the query matching engine 1045 can determine whether any historical query from the first query database D1 matches the user query. In some implementations, the query matching engine 1045 can process the user query to generate a text embedding of the user query, and compare the text embedding of the user query with text embeddings for the first set of historical queries stored in the first query database D1. If a similarity score determined based on a distance between the text embedding of the user query and a text embedding of a particular historical query (Q') in the first query database D1 satisfies a similarity threshold (e.g., a first similarity threshold), the query matching engine 1045 determines that the particular historical query (Q') matches the user query.

The intermediate model output selection engine 1047 can then select a particular intermediate model output, from a total number of $N_1$ intermediate model outputs associated with the particular historical query (Q'), based on the value of the similarity score. As a non-limiting example, the intermediate model output selection engine 1047 can select an intermediate model output generated by a $(N_1-1)$ layer of the first generative model 191 for the particular historical query (Q') if the similarity score satisfies a second similarity threshold that is greater than the first similarity threshold, and select an intermediate model output generated by a $(N_1-2)$ layer of the first generative model 191 for the particular historical query (Q') if the similarity score satisfies the first similarity threshold but not the second similarity threshold. It is noted that, there can be additional similarity threshold configured for selecting the particular intermediate model output, and the total number and/or specific values for the similarity threshold are not limited to descriptions herein, and can be any applicable numbers or values.

In some implementations, in response to receiving the aforementioned user query, the user query can be processed by the LLM engine 1049 using the first generative model 191. In some implementations, optionally, the chat application 104 can include an interception engine 1048 (or a cloud-based interception engine 1248). The interception engine 1048 can determine, in response to the system receiving (or selecting) the particular intermediate model output from the intermediate model output selection engine 1047 (e.g., previously generated using the $M^{th}$ layer of the first generative model 191), whether the user query has been processed using the $M^{th}$ layer of the first generative model 191. In some implementations, in response to determining that the user query has not been processed using the $M^{th}$ layer of the first generative model 191 when the particular intermediate model output is selected (and/or received), the latest intermediate model output generated by the first generative model 191 for the user query can be combined with the selected particular intermediate model output (e.g., previously generated using the $M^{th}$ layer of the first generative model 191), to generate a combined intermediate input. The combined intermediate input can be processed by the LLM engine 1049 using an $(M+1)^{th}$ layer (and/or any subsequently connected layers, if there is any) of the first generative model 191, to eventually generate a final model output that reflects a response responsive to the user query.

In some implementations, optionally, in response to determining that the user query has not been processed using the $M^{th}$ layer of the first generative model 191 when the system selects the particular intermediate model output and in response to the similarity score satisfying the second similarity threshold, the particular intermediate model output can be processed using the $(M+1)^{th}$ layer (and/or any subsequently connected layers, if there is any) of the first generative model 191, without processing the user query, to generate the final model output that reflects the response for the user query.

In some implementations, optionally, the combined intermediate input can be generated based on combining the particular intermediate model output, and a text embedding of the user query (instead of the latest intermediate model output for the user query). The present disclosure, however, is not limited thereto.

In some implementations, in rare cases where the user query has been processed using the $M^{th}$ layer of the first generative model 191 when the particular intermediate model output is selected (or received), processing of the user query using the first generative model 191 can be continued as usual using subsequent layers of the first generative model 191, without using the particular intermediate model output selected from the first query database D1.

FIG. 2A illustrates an example process flow of generating a response in accordance with various aspects of the present disclosure. As shown in FIG. 2A, a user may provide a user input 201 to a user interface (e.g., graphical user interface, audible user interface, etc.) of an application such as the chat application 104 or other application for human-to-computer interactions. The chat application 104 can access, for instance, the second generative model 193 (or the first generative model, or other generative model(s)). In response to receiving the user input 201, the user input 201 can be processed by the LLM engine 1049 using the second generative model 193. Additionally, or alternatively, in response to receiving the user input 201, the user input 201 can be compared with historical queries stored in the second query database D2 (that is associated with the second generative model 193) using the query matching engine 1045. For example, given a respective historical query previously processed using the second generative model 193, the query matching database D2 can calculate a respective similarity score between the user query 201 and the respective historical query, thereby resulting in a plurality of similarity scores 202 (e.g., a total number of P2 similarity scores if the total number of historical queries in the second query database D2 is "P2").

In some implementations, the query matching engine 1045 can include a similarity score determination engine 10451 to calculate the respective similarity score between the user query 201 and the respective historical query by: (i) generating a text embedding ("E1") for the user query 201 (e.g., using a text encoder TE that can be included in, but not necessarily need to be included in the second generative model 193), and (ii) determining a distance (e.g., a cosine distance, or other distance measure) between the text embedding "E1" for the user query 201 (e.g., which is a first n-dimensional vector representing semantic meaning of the user query 201) and a text embedding for the respective historical query (e.g., which is a second n-dimensional vector representing semantic meaning of the respective historical query) in a latent space. The text embedding for the respective historical query can be generated and stored in the second query database D2, or can be generated using the text encoder TE (which may be included in the query matching engine 1045). It is noted that generation of text embedding(s) is often time-efficient and not time-consuming as processing text input using, e.g., attention layers of the generative model(s). The query matching engine 1045 can include a query identification engine 10453 to determine whether the highest similarity score from the plurality of similarity scores satisfies a similarity threshold T1, and in response to determining that the highest similarity score satisfies the similarity threshold T1, the query identification engine 10453 can determine that the user query 201 matches a particular historical query $Q_h$ that the highest similarity score corresponds.

In some implementations, based on a value of the highest similarity score, the intermediate model output selection engine 1047 can select intermediate model output, from a plurality of intermediate model output that were previously generated using the second generative model 193 for the particular historical query $Q_h$. For example, when the value of the similarity score $S_h$ between the user query 201 and the particular historical query (which is determined as the highest similarity score) satisfies not only the similarity threshold T1 but also satisfies an additional similarity threshold T2 (which is greater than T1), an intermediate model output 203A generated by a $(P_2-1)^{th}$ layer of the second generative model 193 can be selected as the particular intermediate model output to accelerate the formulation of a response for the user query 201. In some implementations, as shown in FIG. 2A, the LLM engine 1049 can combine the intermediate model output 203A generated by the $(P_2-1)^{th}$ layer of the second generative model 193 and the text embedding ("$E_1$") for the user query 201, to generate a combined intermediate input 205A. The LLM engine 1049 can provide the combined intermediate input 205A to the $P_2^{th}$ layer (and any subsequent layer(s) connected to the $P_2^{th}$ layer, if any) of the second generative model 193, for a portion of the second generative model 193 (i.e., the $P_2^{th}$ layer and any subsequent layer(s)) to process the combined intermediate input 205A, to generate a response 209A that is responsive to the user query 201.

Optionally, instead of the combined intermediate input 205A, the selected intermediate model output 203A generated by a $(P_2-1)^{th}$ layer of the second generative model 193 can be processed by the LLM engine 1049 using the portion of the second generative model 193 (i.e., the $P_2^{th}$ layer and any subsequent layer(s)), to generate a response for the user query 201.

In some implementations, when the value of the similarity score between the user query 201 and the particular historical query (which is determined as the highest similarity score) satisfies the similarity threshold T1 but does not satisfy the additional similarity threshold T2 (which is greater than T1), an intermediate model output 203B generated by a $(P_2-j)^{th}$ layer of the second generative model 193 can be selected as the particular intermediate model output to accelerate the formulation of a response for the user query 201, where "j" is greater than "1". In some implementations, as shown in FIG. 2A, the LLM engine 1049 can combine the intermediate model output 203B generated by the $(P_2-j)^{th}$ layer of the second generative model 193 and the text embedding ("$E_1$") for the user query 201, to generate a combined intermediate input 205B. The LLM engine 1049 can provide the combined intermediate input 205B to the $(P_2-j+1)^{th}$ layer (and any subsequent layer(s) connected thereto, if any) of the second generative model 193, for another portion of the second generative model 193 (i.e., the $(P_2-j+1)^{th}$ layer and any subsequent layer(s)) to process the combined intermediate input 205B, to generate a response 209B that is responsive to the user query 201.

Optionally, instead of the combined intermediate input 205B, the selected intermediate model output 203B generated by the $(P_2-j)^{th}$ layer of the second generative model 193 can be processed by the LLM engine 1049 using the another portion of the second generative model 193, to generate a response for the user query 201.

Figure 2B:
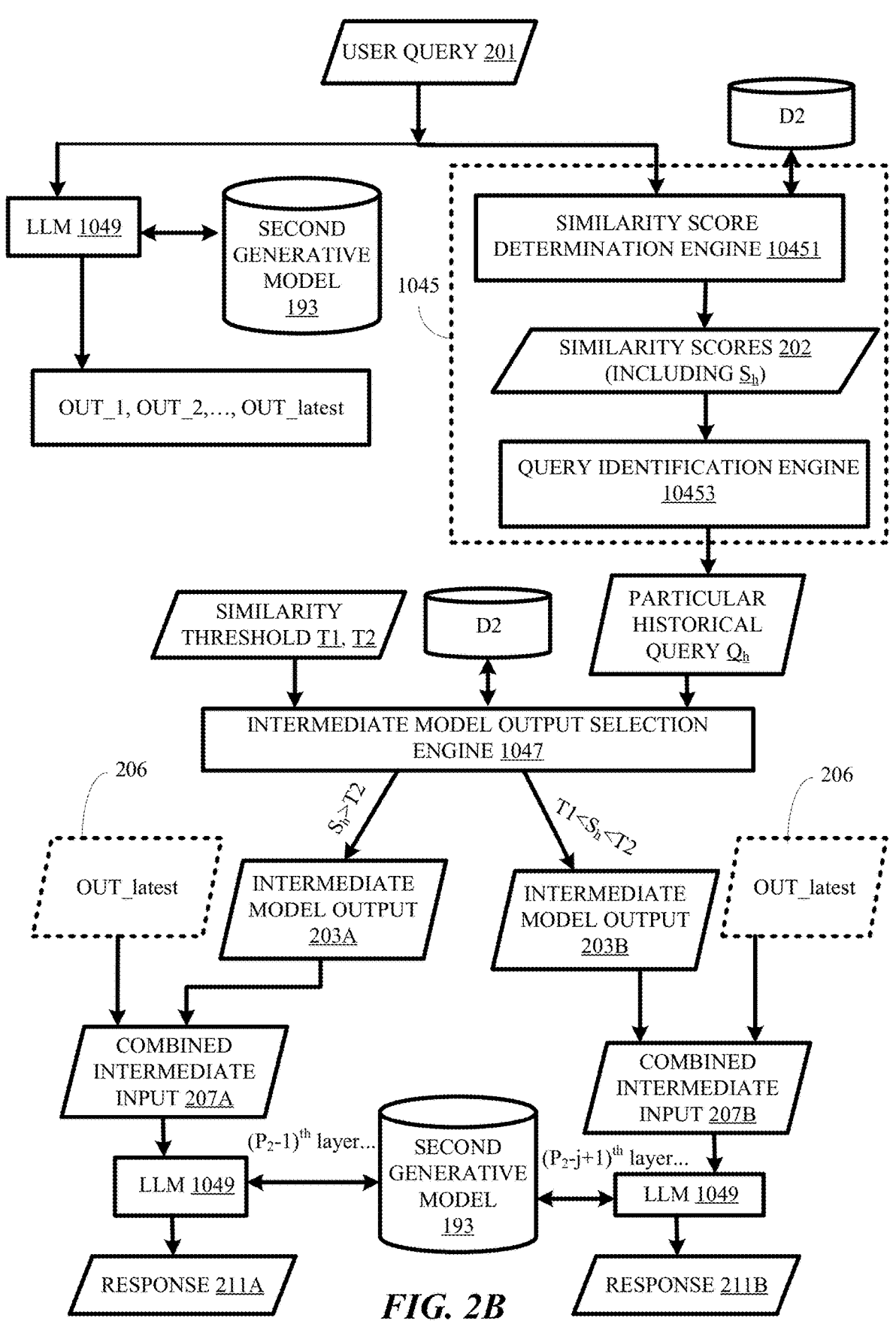
FIG. 2B illustrates another example process flow of generating a response in accordance with various aspects of the present disclosure.

In some implementations, optionally, referring to FIG. 2B, in response to selecting the intermediate model output 203A (or alternatively the intermediate model output 203B, depending on the value of the highest similarity score) as the particular intermediate model output 203, a latest intermediate model output 206 ("OUT_latest") of the second generative model 193 in processing the user query 201 can be determined or retrieved. If the latest intermediate model output 206 is output by a layer of the second generative model 193 prior to the $(P_2-1)^{th}$ layer (or alternatively the $(P_2-j)^{th}$ layer, subsequent processing of the user query 201 using the second generative model 193 can be paused, and instead, a combined model input 207A that combines the latest intermediate model output 206 for the user query 201 and the selected intermediate model output 203A can be generated. Alternatively, in some cases, a combined model input 207B that combines the latest intermediate model output 206 for the user query 201 and the selected intermediate model output 203B can be generated.

The combined model input 207A can be provided to the $P_2^{th}$ layer (e.g., the last attention layer) of the second generative model 193, to eventually determine a response 211A for the user query 201, in case the intermediate model output 203A is selected based on the highest similarity score. Alternatively, the combined model output 207B can be provided to the $(P_2-j+1)^{th}$ layer of the second generative model 193, to eventually determine a response 211B, in case the intermediate model output 203B is selected based on the highest similarity score.

Turning now to FIG. 3, a flowchart illustrating an example scenario 300 of generating a response for a user query is provided, in accordance with various aspects of the present disclosure. A system for performing the method 300 includes one or more processors, memory, and/or other component(s) of computing device(s) (e.g., client computing device 10 of FIG. 1A, one or more servers such as 12 in FIG. 1A, and/or other computing devices). Moreover, while operations of the method 300 are shown in a particular order, this is not meant to be limiting. One or more operations may be reordered, omitted, and/or added. The system, for instance, can be a user interaction system. The user interaction system can include a chat application (or an assistant application) having, or otherwise accesses, an LLM-based assistant that accesses one or more generative models (e.g., 191 and/or 193) or other machine learning models. The chat application (e.g., 104) can be installed at, or otherwise accessed via a client device (e.g., laptop, stand-alone speaker, etc.) having one or more user input devices (e.g., microphone(s)) and/or one or more user output devices (e.g., speaker(s)).

In various implementations, at block 302, the system receives a user query via a user interface of a chat application that accesses a generative model.

In various implementations, at block 304, in response to receiving the user query, the system compares the user query with a plurality of historical queries previously processed using the generative model, to determine a plurality of similarity score each indicating a degree of similarity between the user query and a respective historical query from the plurality of historical queries.

In various implementations, at block 306, the system determines whether any similarity score, from the plurality of similarity scores, satisfies a similarity threshold.

In various implementations, at block 308, in response to determining that a particular similarity score, from the plurality of similarity scores, satisfies the similarity threshold, the system identifies a particular historical query, from the plurality of historical queries previously processed using the generative model, that corresponds to the particular similarity score. In some of the various implementations, each of the plurality of historical queries can be stored (e.g., in a query database) in association with one or more intermediate model outputs generated using the generative model during processing of a respective historical query from the plurality of historical queries.

In various implementations, at block 310, the system selects, based on the particular similarity score, particular intermediate model output from the one or more intermediate model outputs that are previously generated using the generative model for the particular historical query.

In various implementations, at block 312, the system generates a response responsive to the user query based on the selected particular intermediate model output previously generated using the generative model for the particular historical query.

In some of the various implementations, the system generates the response responsive to the user query based on the selected particular intermediate model output by: generating an intermediate input based on the selected particular intermediate model output; processing the intermediate input, using a portion of the generative model, to generate a final model output; and generating the response based on processing the final model output. In some of the various implementations, the system generates the intermediate input based on the selected particular intermediate model output by: combining a tokenized representation of the user query and the selected particular intermediate model output; and generating the intermediate input to include a combination of the tokenized representation of the user query and the selected particular intermediate model output. In some of the various implementations, the tokenized representation of the user query is a first n-dimensional vector representing semantic meanings of the user query, and the selected particular intermediate model output is a second n-dimension vector different from the first n-dimensional vector.

In some of the various implementations, wherein the tokenized representation of the user query is generated based on processing the user query using a text encoder. In some of the various implementations, the text encoder is included in the generative model, or is separate from the generative model.

In some of the various implementations, the system further processes, in response to receiving the user query, the user query using the generative model to generate one or more intermediate model output associated with the user query. In some of the various implementations, the system generates the response responsive to the user query based on the selected particular intermediate model output by: in response to selecting the particular intermediate model output, determining a latest intermediate model output from the one or more intermediate model outputs associated with the user query; and generating the response based on processing the latest intermediate model output that is associated with the user query and the selected particular intermediate model output that is associated with the particular historical query, using a portion of the generative model.

In some of the various implementations, the selected particular intermediate model output is generated using a particular layer of the generative model, and wherein the latest intermediate model output that is associated with the user query and the selected particular intermediate model output that is associated with the particular historical query are provided to a subsequent layer of the generative model that is connected subsequent to the particular layer.

In some of the various implementations, in response to determining that no similarity score from the plurality of similarity scores satisfies the similarity threshold, the system processes the user query using the generative model, to generate the response responsive to the user query.

In some implementations, the generative model can be a transformer-based large language model ("LLM"). As a non-limiting example, the generative model can include a transformer decoder. The transformer decoder can include one or more multi-head attention mechanisms ("multi-head attentions"), where each multi-head attention mechanism can include multiple attention heads. In this example, each attention head can include, for instance, a query matrix, a key matrix, and a value matrix paired with the key matrix. In some implementations, optionally, the ML model can additionally include a transformer encoder. The transformer encoder can include one or more multi-head attention mechanisms ("multi-head attentions"), where each multi-head attention mechanism can include multiple attention heads.

Figure 4:
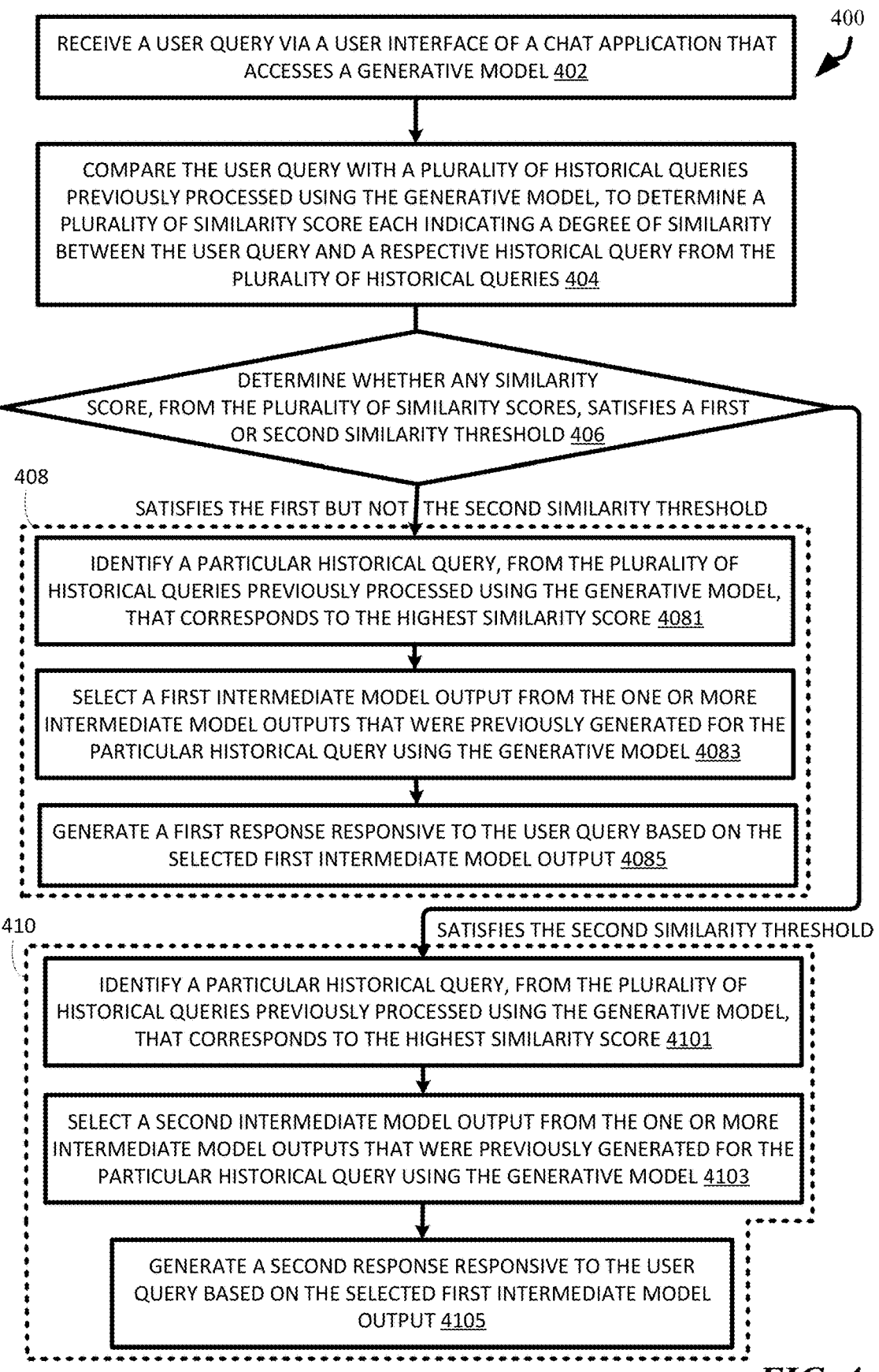
FIG. 4 depicts a flowchart illustrating another example method of generating a response, in accordance with various aspects of the present disclosure.

Turning now to FIG. 4, a flowchart illustrating another example method 400 of generating a response is provided, in accordance with various aspects of the present disclosure. A system for performing the method 400 includes one or more processors, memory, and/or other component(s) of computing device(s) (e.g., client computing device 10 of FIG. 1A, one or more servers such as 12 in FIG. 1A, and/or other computing devices). Moreover, while operations of the method 400 are shown in a particular order, this is not meant to be limiting. One or more operations may be reordered, omitted, and/or added.

At block 402, the system receives a user query, where the user query is received via a user interface of a chat application that accesses with a generative model.

At block 404, the system, in response to receiving the user query, compares the user query with a plurality of historical queries previously processed using the generative model, to determine a plurality of similarity score each indicating a degree of similarity between the user query and a respective historical query from the plurality of historical queries. Each of the plurality of historical queries is stored in association with one or more intermediate model outputs generated using the generative model during processing of a respective historical query from the plurality of historical queries.

At block 406, the system determines whether any similarity score, from the plurality of similarity scores, satisfies a first similarity threshold or a second similarity threshold that is greater than the first similarity threshold.

At block 408, in response to determining that a highest similarity score, from the plurality of similarity scores, satisfies the first similarity threshold and does not satisfy the second similarity threshold, the system can identify a particular historical query, from the plurality of historical queries previously processed using the generative model, that corresponds to the highest similarity score (block 4081), select, based on the highest similarity score satisfying the first similarity threshold, a first intermediate model output from the one or more intermediate model outputs that were previously generated for the particular historical query using the generative model (block 4083), and generate a first response responsive to the user query based on the selected first intermediate model output (block 4085).

At block 410, in response to determining that the highest similarity score, from the plurality of similarity scores, satisfies the second similarity threshold, the system can: identify the particular historical query, from the plurality of historical queries previously processed using the generative model, that corresponds to the highest similarity score (see block 4101), selecting, based on the highest similarity score satisfying the second similarity threshold that is greater than the first similarity threshold, a second intermediate model output from the one or more intermediate model outputs that were previously generated for the particular historical query using the generative model (block 4103), and generate a second response responsive to the user query based on the selected second intermediate model output (block 4105). It is noted that, the second response is not to be generated simultaneously as the first response, but is an alternate response generated by systems and methods described herein in situations where the highest similarity score, from the plurality of similarity scores, is identified as satisfying the second similarity threshold In some implementations, the first intermediate model output was previously generated by a first intermediate layer of the generative model for the particular historical query, wherein the second intermediate model output was previously generated by a second intermediate layer of the generative model for the particular historical query, and wherein the second intermediate layer is subsequent to the first intermediate layer.

Optionally, in response to determining that the highest similarity score, from the plurality of similarity scores, does not satisfy the first similarity threshold and does not satisfy the second similarity threshold, the system can process the user query using the generative model, to generate a third response responsive to the user query. It is noted that, the third response is not to be generated simultaneously as the first (or second) response, but is an alternate response generated by systems and methods described herein in situations where the highest similarity score, from the plurality of similarity scores, is identified as not satisfying the second similarity threshold and not satisfying the first similarity threshold.

In some of the various implementations, in response to determining that the highest similarity score, from the plurality of similarity scores, satisfies the second similarity threshold, the system identifies the particular historical query, from the plurality of historical queries previously processed using the generative model, that corresponds to the highest similarity score; selects, based on the highest similarity score satisfying the second similarity threshold that is greater than the first similarity threshold, a second intermediate model output from the one or more intermediate model outputs that were previously generated for the particular historical query using the generative model; and generates a second response responsive to the user query based on the selected second intermediate model output. The second response can be alternative to the first response and is not generated simultaneously with the first response.

In some of the implementations, the first intermediate model output was previously generated by a first intermediate layer (e.g., antepenultimate layer) of the generative model for the particular historical query, wherein the second intermediate model output was previously generated by a second intermediate layer (e.g., penultimate layer) of the generative model for the particular historical query, and wherein the second intermediate layer (e.g., penultimate layer) is connected to, and follows (e.g., is subsequent to), the first intermediate layer (e.g., antepenultimate layer).

Figure 5:
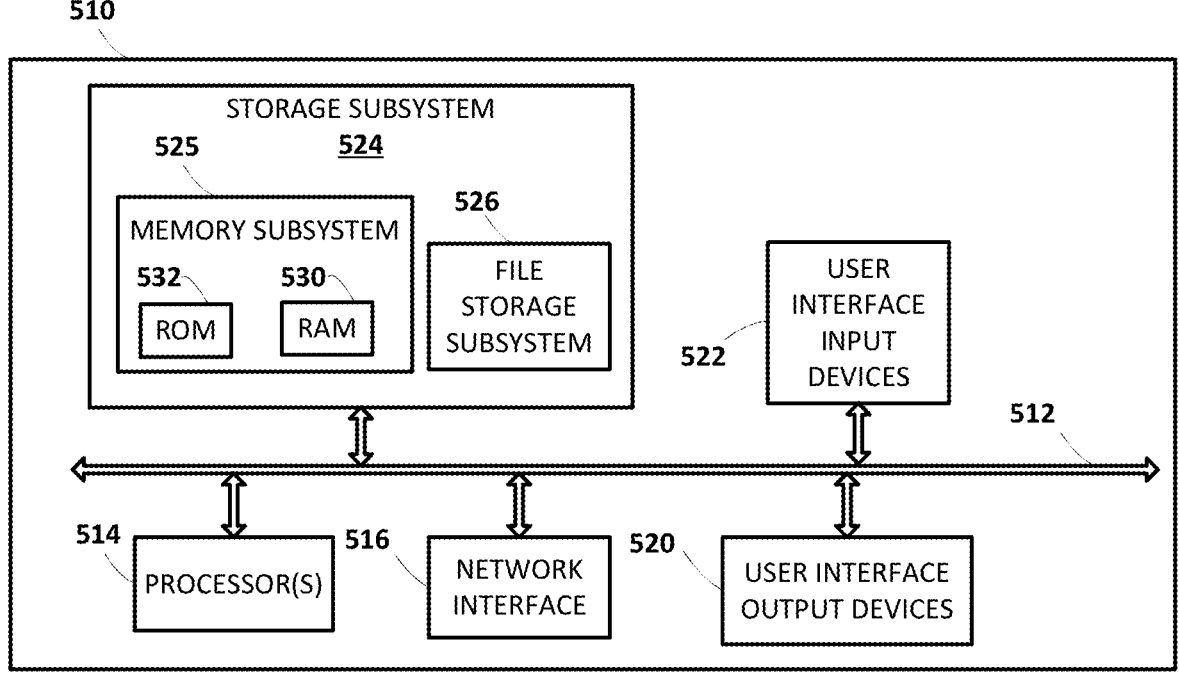
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based chat application 104 component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, an additional method 600 is provided. For example, referring to FIG. 6, the method 600 for generating a response can include a block 602 at which the system receives a user query via a user interface of an assistant application (also referred to as an automated assistant, a chatbot, a virtual assistant, an automated assistant application, etc.). The system can include the assistant application. The assistant application can have one or more local components accessible via a client device (e.g., 10 in FIG. 1A). The one or more local components can be the same as, or similar to, the aforementioned query matching engine 1045, intermediate model output selection engine 1047, interception engine 1048, and/or LLM engine 1049, etc. Additionally or alternatively, the assistant application can include one or more cloud-based components accessible via one or more servers (e.g., 12). The one or more cloud-based components can be the same as, or similar to, components 1247, 1245, 1249, 1248 in FIG. 1A. The assistant application can access a generative model (or more than one generative models or other machine learning model(s)). Descriptions of the system are not limited herein.

In various implementations, at block 604, in response to receiving the user query, the system compares the user query with a plurality of queries (e.g., historical queries previously processed using the generative model and/or stored in a query database), to determine (e.g., calculate) a plurality of matching scores indicating whether the user query matches any query from the query database. For example, the plurality of matching scores can be a plurality of similarity scores each indicating a degree of similarity between the user query and a respective historical query from the plurality of historical queries.

In some of the various implementations, the query database is associated with the generative model, and the generative model can have multiple computing layers. The query database can further store, for each of the plurality of queries, one or more precomputed intermediate layer outputs from one or more computing layers (out of the multiple computing layers) of the generative model based on prior processing a respective query in the query database.

In various implementations, at block 606, the system selects a particular query (e.g., a particular historical query) from the query database (e.g., from the plurality of queries previously processed using the generative model).

In various implementations, at block 608, the system retrieves a given intermediate model output (also referred to as "particular intermediate model output") associated with the particular query in the query database.

In various implementations, at block 610, the system generates a response responsive to the user query based at least on processing the selected intermediate layer output using one or more layers of the generative model that follow the particular layer.

In various implementations, at block 612, the system causes the response to be rendered on one or more output devices. For example, the response can be rendered with respect to a text (or image, or other content) determined from the user query at the user interface of the assistant application.

In some of the various implementations, the system further processes the user query to generate a tokenized representation of the user query. Optionally, the system can process the user query to generate a tokenized representation of the user query in response to receiving the user query. Optionally, the system can generate the response responsive to the user query by: combining the tokenized representation of the user query with the selected given precomputed intermediate layer output, to generate an intermediate input; processing the intermediate input, using the one or more layers of the generative model that follow the particular layer, to generate a final model output; and generating the response responsive to the user query based on processing the final model output.

In some of the various implementations, the system selects and/or retrieves a particular computing layer of the generative model based on the matching score associated with the selected particular query, wherein the given precomputed intermediate layer output was precomputed/generated using the selected particular computing layer of the generative model. In some of the various implementations, the matching score associated with the selected particular query satisfies a first matching threshold (e.g., 0.95), and the given intermediate layer output is generated by a penultimate layer of the generative model based on processing the particular query. In some of the various implementations, the matching score associated with the selected particular query satisfies a second matching threshold (e.g., 0.8) and does not satisfy the first matching threshold (e.g., 0.95), and the given intermediate layer output is generated by an antepenultimate layer of the generative model based on processing the particular query.

As a non-limiting example, given the user query of "where is the highest mountain around the world?" and a particular query (previously processed using the generative model) of "where sits the highest mountain around the world", the matching score can be calculated to be approximately 0.97, which satisfies the first matching threshold (e.g., 0.95). In this case, the retrieved given intermediate layer output for formulating the response for the user query can be (but is not limited to be) generated by a penultimate layer of the generative model based on prior processing of the particular query. As another non-limiting example, given the user query of "where is the highest mountain around the world?" and a particular query (previously processed using the generative model) of "where are the highest mountains around the world", the matching score can be calculated to be approximately 0.86, which satisfies the second matching threshold (e.g., 0.8) but not the first matching threshold (e.g., 0.95). In this case, the retrieved given intermediate layer output for formulating the response for the user query can be (but is not limited to be) generated by an antepenultimate layer of the generative model based on prior processing of the particular query. It is note that the present disclosure is not limited to descriptions herein.

What is claimed is:

1. A computer-implemented method for reducing network resource consumption, the method comprising:

receiving a user query via a user interface of an assistant application running at a client device;

in response to receiving the user query:

comparing the user query with a plurality of queries stored in a query database to calculate a plurality of matching scores indicating whether the user query matches any query from the query database, wherein the query database is associated with a generative model having multiple computing layers and further stores, for each of the plurality of queries, one or more precomputed intermediate layer outputs from one or more computing layers of the multiple computing layers of the generative model based on prior processing of a respective query in the query database;

based on the plurality of matching scores, selecting a particular query from the query database;

retrieving a given precomputed intermediate layer output associated with the particular query in the database, wherein the intermediate layer output relates to an intermediate layer of the generative model stored remotely from the client device;

generating a response responsive to the user query based at least on processing the selected intermediate layer output using one or more layers of the generative model that follow the intermediate layer, wherein the one or more layers of the generative model that follow the intermediate layer are stored at the client device; and causing the response to be rendered on one or more output devices.

2. The method of claim 1, further comprising:

processing the user query to generate a tokenized representation of the user query.

3. The method of claim 2, wherein generating the response responsive to the user query comprises:

combining the tokenized representation of the user query with the given precomputed intermediate layer output, to generate an intermediate input, processing the intermediate input, using the one or more layers of the generative model that follow the intermediate layer, to generate a final model output, and generating the response responsive to the user query based on processing the final model output.

4. The method of claim 1, further comprising selecting an intermediate layer of the generative model based on a matching score associated with the selected particular query, wherein the given precomputed intermediate layer output was generated using the intermediate layer of the generative model.

5. The method of claim 4, wherein the matching score associated with the selected particular query satisfies a first matching threshold, and wherein the intermediate layer is a penultimate layer of the generative model, and the given intermediate layer output is generated by the intermediate layer based on processing the particular query.

6. The method of claim 5, wherein the matching score associated with the selected particular query satisfies a second matching threshold and does not satisfy the first matching threshold, wherein the intermediate layer is an antepenultimate layer of the generative model, and wherein the given intermediate layer output is generated by the intermediate layer based on processing the particular query.

7. One or more non-transitory computer-readable media comprising instructions that, upon execution of the instructions by one or more processors of one or more electronic devices, are to cause the one or more electronic devices to perform a computer-implemented method for reducing network resource consumption, the method comprising:

identifying a user query received via a user interface of an assistant application running at a client device;

in response to identifying the user query:

comparing the user query with a plurality of queries stored in a query database to calculate a plurality of matching scores indicating whether the user query matches any query from the query database, wherein the query database is associated with a generative model having multiple computing layers and further stores, for each of the plurality of queries, one or more precomputed intermediate layer outputs from one or more computing layers of the multiple computing layers of the generative model based on prior processing of a respective query in the query database;

based on the plurality of matching scores, selecting a particular query from the query database;

retrieving a given precomputed intermediate layer output associated with the particular query in the database, wherein the intermediate layer output relates to an intermediate layer of the generative model stored remotely from the client device;

generating a response responsive to the user query based at least on processing the selected intermediate layer output using one or more layers of the generative model that follow the intermediate layer, wherein the one or more layers of the generative model that follow the intermediate layer are stored at the client device; and causing the response to be rendered on one or more output devices.

8. The one or more non-transitory computer-readable media of claim 7, wherein the method further comprises:

processing the user query to generate a tokenized representation of the user query.

9. The one or more non-transitory computer-readable media of claim 8, wherein generation of the response responsive to the user query comprises:

combining the tokenized representation of the user query with the given precomputed intermediate layer output, to generate an intermediate input, processing the intermediate input, using the one or more layers of the generative model that follow the intermediate layer, to generate a final model output, and generating the response responsive to the user query based on processing the final model output.

10. The one or more non-transitory computer-readable media of claim 7, wherein the method further comprises selecting an intermediate layer of the generative model based on a matching score associated with the selected particular query, wherein the given precomputed intermediate layer output was generated using the intermediate layer of the generative model.

11. The one or more non-transitory computer-readable media of claim 10, wherein the matching score associated with the selected particular query satisfies a first matching threshold, and wherein the intermediate layer is a penultimate layer of the generative model, and the given intermediate layer output is generated by the intermediate layer based on processing the particular query.

12. The one or more non-transitory computer-readable media of claim 11, wherein the matching score associated with the selected particular query satisfies a second matching threshold and does not satisfy the first matching threshold, wherein the intermediate layer is an antepenultimate layer of the generative model, and wherein the given intermediate layer output is generated by the intermediate layer based on processing the particular query.

13. A system comprising:

one or more processors; and one or more non-transitory computer-readable media comprising instructions that, upon execution of the instructions by the one or more processors, are to cause the one or more electronic devices to perform a computer-implemented method for reducing network resource consumption, the method comprising:

identifying a user query received via a user interface of an assistant application running at a client device;

in response to identifying the user query:

comparing the user query with a plurality of queries stored in a query database to calculate a plurality of matching scores indicating whether the user query matches any query from the query database, wherein the query database is associated with a generative model having multiple computing layers and further stores, for each of the plurality of queries, one or more precomputed intermediate layer outputs from one or more computing layers of the multiple computing layers of the generative model based on prior processing of a respective query in the query database;

based on the plurality of matching scores, selecting a particular query from the query database;

retrieving a given precomputed intermediate layer output associated with the particular query in the database, wherein the intermediate layer output relates to an intermediate layer of the generative model stored remotely from the client device;

generating a response responsive to the user query based at least on processing the selected intermediate layer output using one or more layers of the generative model that follow the intermediate layer, wherein the one or more layers of the generative model that follow the intermediate layer are stored at the client device; and causing the response to be rendered on one or more output devices.

14. The system of claim 13, wherein the method further comprises:

processing the user query to generate a tokenized representation of the user query.

15. The system of claim 14, wherein generation of the response responsive to the user query comprises:

combining the tokenized representation of the user query with the given precomputed intermediate layer output, to generate an intermediate input, processing the intermediate input, using the one or more layers of the generative model that follow the intermediate layer, to generate a final model output, and generating the response responsive to the user query based on processing the final model output.

16. The system of claim 13, wherein the method further comprises selecting an intermediate layer of the generative model based on a matching score associated with the selected particular query, wherein the given precomputed intermediate layer output was generated using the intermediate layer of the generative model.

17. The system of claim 16, wherein the matching score associated with the selected particular query satisfies a first matching threshold, and wherein the intermediate layer is a penultimate layer of the generative model, and the given intermediate layer output is generated by the intermediate layer based on processing the particular query.

18. The system of claim 17, wherein the matching score associated with the selected particular query satisfies a second matching threshold and does not satisfy the first matching threshold, wherein the intermediate layer is an antepenultimate layer of the generative model, and wherein the given intermediate layer output is generated by the intermediate layer based on processing the particular query.

* * * * *